United States Patent
Soto et al.

[19]

[11] Patent Number: 5,956,385
[45] Date of Patent: Sep. 21, 1999

[54] TEST SET INTERFACE FOR AUTOMATICALLY DETECTING LINE TYPE

[75] Inventors: Roy L. Soto, Moorpark; Linda L. Hathorn, Camarillo; Edward J. Zoiss, Moorpark, all of Calif.

[73] Assignee: Harris Corporation, Melbourne, Fla.

[21] Appl. No.: 08/815,885

[22] Filed: Mar. 12, 1997

[51] Int. Cl.⁶ .............................. H04M 1/24; H04M 3/08; H04M 3/22
[52] U.S. Cl. ................................ 379/27; 379/10; 379/15; 379/21; 379/29
[58] Field of Search .................................. 379/1, 10, 19, 379/21, 27, 28, 29, 32, 34, 6, 26, 30, 15

[56] References Cited

U.S. PATENT DOCUMENTS

| | | | |
|---|---|---|---|
| 4,843,620 | 6/1989 | Hagedorn | 379/21 |
| 4,922,516 | 5/1990 | Butler et al. | 379/21 |
| 5,193,108 | 3/1993 | Stocklin | 379/21 |
| 5,208,846 | 5/1993 | Hammond et al. | 379/15 |
| 5,377,259 | 12/1994 | Butler et al. | 379/93 |
| 5,528,662 | 6/1996 | Stephens | 379/29 |
| 5,535,336 | 7/1996 | Smith et al. | 395/200.06 |
| 5,546,549 | 8/1996 | Barrett et al. | 395/309 |
| 5,557,748 | 9/1996 | Norris | 395/200.1 |
| 5,592,528 | 1/1997 | Nelson et al. | 379/21 |

*Primary Examiner*—Curtis A. Kuntz
*Assistant Examiner*—Binh K. Tieu
*Attorney, Agent, or Firm*—Charles E. Wands

[57] ABSTRACT

A test set interface automatically determines the type of communication link to which it is coupled, and then configures internal test circuitry to support testing of that particular type of line, irrespective of which of a plurality of different types of communication signals the line may be conveying. The interface includes a multiconductor line cord, end connections of which are configured for connection with any of multiple types of telecommunication circuits. A telecommunication circuit analysis is coupled to the line cord and to test circuitry, and is operative to analyze electrical characteristics of a respective telecommunication circuit to which the line cord is selectively connected by a test set microcontroller, so as to determine which of the different types of communication signals is being conveyed by the telecommunication circuit. In response to this determination, the test set configures its test circuitry to test the operation of the telecommunication circuit in accordance with the type of communication signal detected.

23 Claims, 1 Drawing Sheet

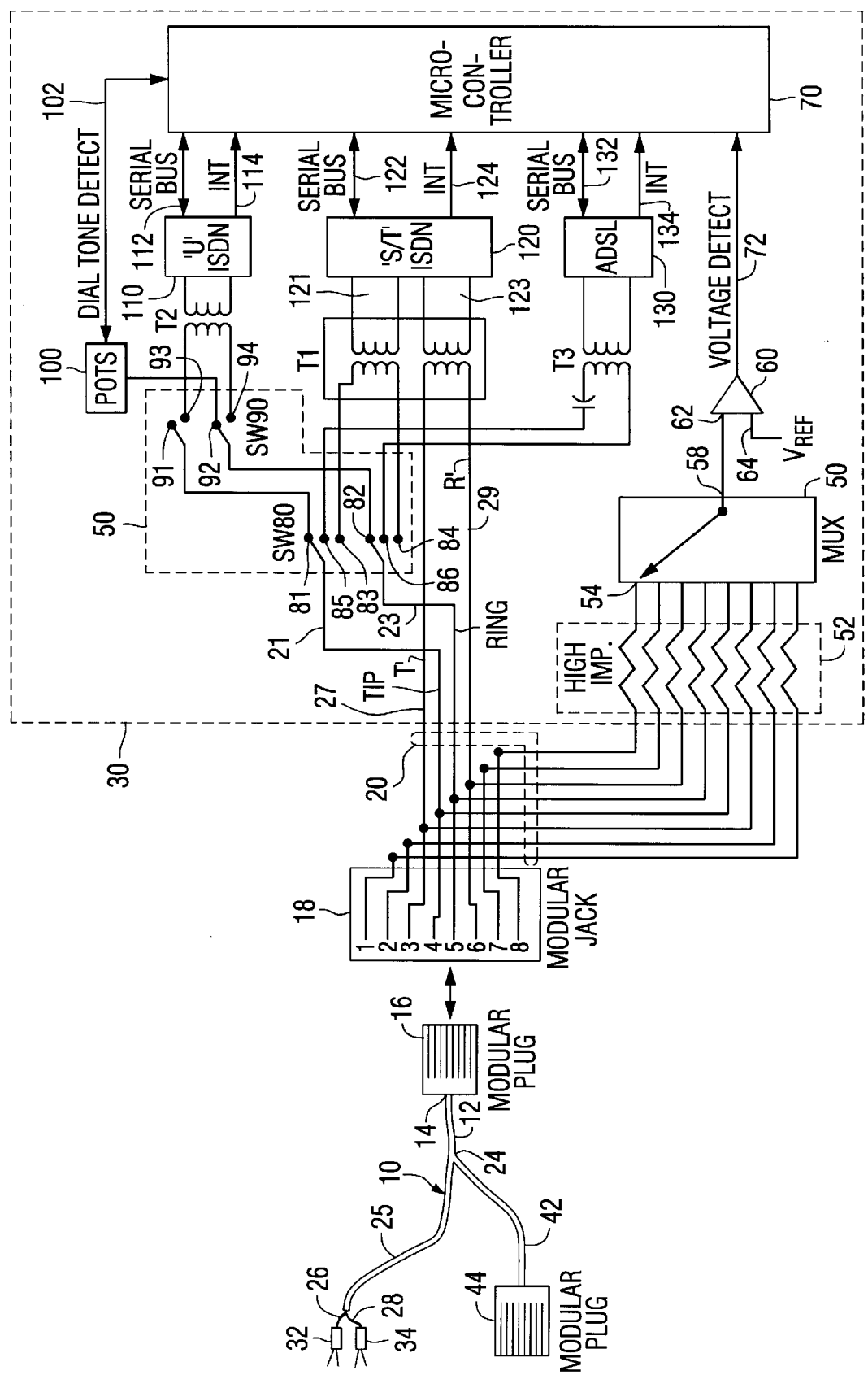

TEST SET INTERFACE FOR AUTOMATICALLY DETECTING LINE TYPE

FIELD OF THE INVENTION

The present invention relates in general to telecommunication systems, and is particularly directed to a test set interface for automatically identifying the type of communication signals being conveyed by a line to which a craftsperson's test set is connectable by way of a universal multiconductor line cord and for coupling the connected line to telephone circuit test circuitry within the test set for enabling the testing of the line irrespective what type of communication signal is being conveyed.

BACKGROUND OF THE INVENTION

Accompanying the continuing demand for digital signalling services throughout the telecommunications industry are requirements to test various telephone lines that may carry either POTS or digital signals including, but not limited to, high speed data service loop (HDSL) signals, asymmetrical data service loop (ADSL) signals, digital data service (DDS) signals and integrated services digital network (ISDN) signals. Presently available test circuits employed for this purpose, such as that described in the U.S. Pat. No. 5,208,846, to Hammond et al, entitled: "Subscriber Loop Tester for Telephone Switching Systems," are akin to 'kluge' configurations, employing a plurality of different types of line connect interfaces/jacks, for connection with different types of telecommunication circuits. As such they require that the user have a priori knowledge of the type of communication link to which the test set is to be coupled. Without this information, the technician does not know to which jack the line should be connected, and cannot readily configure the test set to support a particular user interface and associated test set termination hardware (line cords).

SUMMARY OF THE INVENTION

In accordance with the present invention, the cumbersome hardware configuration of such prior art test sets and the need for the craftsperson to have a priori knowledge of the line are effectively obviated by a new and improved test set interface that is operative to automatically determine the type of communication link to which the test set is coupled, and then configure the test set to support testing of that particular type, irrespective of which of a plurality of different types of communication signals the line is conveying.

For this purpose, the test set interface of the present invention includes a single multiconductor connector arrangement that is configured for connection with a variety of telecommunication circuits conveying different types of communication signals. Preferably, the multiconductor connector arrangement comprises a universal multiconductor line cord of the type described in co-pending patent application Ser. No. 08/759,096, filed Dec. 3, 1996, by E. Zoiss et al, entitled: "Multiconnector-Terminated Multi-Segment Line Cord with Strain Relief Attachment for Telephone Test Set," assigned to the assignee of the present application and the disclosure of which is incorporated herein.

As described in the Zoiss application, such a universal multiconductor line cord contains a first multiconductor cable section that has a first end coupled, as by way of a mating RJ type plug and jack arrangement, to a telecommunication circuit analysis unit within the test set. A second end of this first multiconductor cable is terminated at a splice external to the test set body. In addition, respective single wire cable sections extend from the splice and contain selected conductors of the first multiconductor cable section that are individually terminated by respective electrical connectors, such as alligator clips, to allow direct connection to accessible locations, such as tip and ring conductors, of a telephone circuit of interest. A second multiconductor cable section extends from the splice and includes the plural conductors of the first multiconductor cable section. This second cable section is terminated by a second multiconductor connector (an RJ type modular connector) for engagement with an associated multiconductor receptacle for the telecommunication circuit.

The telecommunication circuit analysis unit is coupled to the first multiconductor cable section and to test circuitry of the test set. The telecommunication circuit analysis unit is operative to sequentially analyze respectively different electrical characteristics of the particular telecommunication circuit to which the multiconductor connector arrangement is connected, in order to determine which of a plurality of different types of communication signals is conveyed by the line to which the interface has been coupled. Such different electrical characteristics include voltage magnitude, dial tone and any one of plural types of communication signals having respectively different (digital) signalling formats.

The telecommunication circuit analysis unit comprises a plurality of telecommunication circuit condition detection circuits that are respectively configured to determine the type of communication signals conveyed by the line when connected thereto. In also includes a switching circuit that is coupled to the first multiconductor cable section and is operative to provide a communication path between a selected one of the telecommunication circuit condition detection circuits and the multiconductor line cord. Under control of an associated microcontroller, the switching circuit sequentially couples the leads of the line cord to respective ones of the detection circuits for prescribed detection intervals. As each the line is terminated to each interface circuit, the output of the interface circuit is monitored by the microcontroller to determine whether the detection circuit has detected electrical characteristics expected to be encountered by that interface. Once the line type has been identified, the test circuitry is configured for testing the operation of the telecommunication circuit in accordance with which type of communication signals has been determined to be conveyed by the line.

BRIEF DESCRIPTION OF THE DRAWINGS

The single FIGURE diagrammatically illustrates an embodiment of the test set interface in accordance with the present invention.

DETAILED DESCRIPTION

Before describing in detail the new and improved test set interface of the present invention, it should be observed that the invention resides primarily in what is effectively a prescribed arrangement of conventional communication circuits and associated digital signal processing components and attendant supervisory control circuitry therefor, that controls the operations of such circuits and components. Consequently, the configuration of such circuits components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

The test set interface in accordance with the present invention is diagrammatically illustrated in the single Figure as comprising a 'universal' type of multiconductor line cord 10, that is configured for connection with a variety of telecommunication circuits which the test circuitry of the test set is capable of testing. As described previously, multiconductor line cord 10 is preferably configured as described in the above-referenced Zoiss et al application.

As illustrated in the Figure, multiconductor line cord 10 has a first multiconductor cable section 12 containing a plurality of (e.g., eight) conductors, preferably encased in a flexible (e.g., braided nylon) insulation-jacket. This first multiconductor cable section 12 is insertable through a sealed, strain-relief aperture of the test set body into the interior of the test set and is terminated at a first end 14 by means of a first multi-terminal plug, such as an RJ45 style modular plug 16, as a non-limiting example. Within the test set, the first RJ45 style modular plug 16 of the multiconductor cable section 12 plugs into an RJ45 style modular jack 18. The respective terminals of the multiconductor jack 18 are coupled via links 20 to a telecommunication circuit analysis unit 30, to be described.

A second end of the first multiconductor cable section 12 is terminated at a splice 24 external to the test set body. Extending from the splice 24 is cable section 25 containing an auxiliary pair of two of the conductors of the line cord 10 (e.g., those respectively associated with the tip and ring pin assignments (pins 3 and 6) of RJ45 modular plug 16) as respective (braided) insulation-jacketed, single wire cable sections 26 and 28. These single wire cable sections 26 and 28 are individually terminated by respective alligator clips 32 and 34 (preferably provided with associated protective rubber boots), so as to enable a craftsperson to directly bridge the test set to any accessible location of a telephone network, where an RJ type of plug/jack connection is not available to the telecommunication circuit of interest.

The line cord 10 further includes a second, multiconductor cable section 42 that extends from the splice 24 and contains each of the (eight) conductors of the multiconductor cable section 12. This section of cable 42 is terminated by an additional RJ style modular plug 44. Since the second, multiconductor cable section 42 is effectively an extension of the first multiconductor cable section 12 and is terminated by way of an RJ style jack, cable section 42 allows the test set to be readily plugged into an external RJ style jack of the network installation and thereby facilitate test set access to the telecommunication circuit of interest.

The telecommunication circuit analysis unit 30 comprises a plurality of telecommunication circuit condition detection circuits, which are selectively coupled to the links 20 from the jack 18 via a microprocessor-controlled switching arrangement 50, for analyzing respectively different electrical characteristics (such as voltage magnitude, dial tone and any one of plural types of communication signals having respectively different (digital) signalling formats) of the particular telecommunication circuit to which the multiconductor line cord 10 is connected, so as to determine which of a plurality of different types of communication signals is conveyed by the line of interest.

For determining whether a voltage of at least a prescribed magnitude is present on any of the leads 20, respective ones of leads 20 are coupled via respective high impedance resistances 52 to a set of input terminals 54 of a multiplexer 56. Multiplexer 56 has an output terminal 58 coupled to a first input 62 of a voltage comparator 60, a second input 64 of which is coupled to receive a prescribed reference voltage $V_{REF}$. Under the control of a microcontroller 70, multiplexer 56 is operative to sequentially couple each of the leads 20 from the jack 18 to input 62 of the voltage comparator 60. If the line voltage exceeds the threshold reference voltage, comparator provides an output on a voltage detect line 72 which is read by the microcontroller 70. The states of respective ones of the leads 20 may then be mapped by an internal truth table used by the microcontroller 70 to identify the type of line to which the test set is connected.

For interfacing with a POTS line, a first pair of tip and ring conductors 21 and 23 of the set of leads 20 are selectively coupled through a circuit path that includes a first set of switch contacts 81 and 82 of a switch 80 and a first set of switch contacts 91 and 92 of a switch 90 of the microprocessor-controlled switching arrangement 50. Switch contact 92 of switch 90 is coupled to a POTS line interface module 100, that includes a dial tone detector and DTMF signalling circuitry. When the microcontroller 70 controls the operation of switches 80 and 90 to provide a circuit path between conductors 21 and 23 and the POTS interface 100, it also causes an OFF-HOOK condition to be presented by the interface to the tip and ring conductors, so that dial tone, if present, may be detected. The microcontroller monitors and controls the operation of the POTS interface module 100 through has an input/output link 102.

For interfacing with ISDN signals conveyed over a two-wire network line, under microprocessor control, the tip and ring conductors 21 and 23 of the set of leads 20 are selectively coupled through a circuit path that includes the first set of switch contacts 81 and 82 of switch 80 and a second set of switch contacts 93 and 94 of switch 90. Switch contacts 93 and 94 of switch 90 are transformer-coupled through a transformer T2 to an industry standard two-wire ISDN interface 'U' chip 110. Communications between the ISDN interface U chip 110 and the microcontroller 70 are effected by means of a serial bus 112 and an interrupt lead 114.

For interfacing with ISDN signals conveyed over a four-wire line serving customer premises terminal equipment, the first pair of tip and ring conductors 21 and 23 of the set of leads 20 are selectively coupled through a circuit path that includes a second set of switch contacts 83 and 84 of switch 80, which are transformer-coupled through a first winding pair of transformer T1 to a first two-wire port 121 of four-wire ISDN interface 'S/T' interface chip 120. A second pair of 'return' tip and ring conductors 27 and 29 of the set of leads 20 are transformer-coupled through a second pair of windings of transformer T1 to a second two-wire port 123 of four-wire ISDN 'S/T' chip 120. Communications between the S/T chip 120 and the microcontroller 70 are effected by means of a serial bus 122 and an interrupt lead 124.

For interfacing with a two-wire ADSL line, the tip and ring conductors 21 and 23 of the set of leads 20 are controllably coupled by switching arrangement through a circuit path that includes a third set of switch contacts 85 and 86 of switch 80. Switch contacts are transformer-coupled through transformer T3 to a two-wire ADSL interface chip 130, which has its serial bus 132 and interrupt lead 134 coupled to microcontroller 70.

In operation, the craftsperson connects the multiconductor line cord 10 to telecommunication circuit of interest, typically by way of the RJ style modular plug 44 at the terminal end of multiconductor cable section 42. Then, in response to an user input from the test set's keypad (not shown), microcontroller 70 proceeds to selectively couple the leads 20 of the test set line cord termination 18 to respective ones of the above described interface circuits for prescribed line status analysis intervals. (The order in which the respective interface circuits are coupled with the line being a matter of design choice.) As the microcontroller 70 controls the operation of the switches of the switching arrangement 50 so as to selectively terminate the line to be tested with each interface circuit, the output of that interface circuit is monitored by the microcontroller, in order to determine whether that interface circuit has detected electrical characteristics it expects to be encountered on the line.

As a non-limiting example, if the telecommunication circuit of interest to which the line under test is coupled is a two-wire network terminated ISDN signalling device, then until the line has been controllably coupled by the controlled switching arrangement 50 to the two-wire ISDN interface 'U' chip 110, none of the other interface circuits that may have been coupled to the line will have detected signals of the type they expect to see on the line. In response to the line being controllably coupled by the controlled switching arrangement 50 to the two-wire ISDN interface 'U' chip 110 via switch contacts 81 and 82 of switch 80 and switch contacts 93 and 94 of switch 90, the two-wire ISDN interface 'U' chip 110, will detect 160 MHZ 2B1Q signalling, and will provide an interrupt via interrupt lead 114. In response to this interrupt, the microcontroller 70 provides a visual output via the test set's display panel, indicating to the user that a two-wire ISDN circuit has been detected. It also preferably displays an associated test procedure menu, that will allow the craftsperson to step through a stored test routine for conducting ISDN format testing of the two-wire network circuit (via the serial bus 112, through which the microcontroller 70 is linked to the U chip 110).

It should be noted that the respectively different types of signal characteristic detection circuits described above are not limitative of the various types of interface circuits which are employable as part of the test set interface of the present invention. The various types of circuits described herein are presented as practical non-limitative examples of telecommunication technology components that are readily integrated into the circuitry of a craftsperson's test set for interfacing the different types of telecommunication signals that can be expected to be encountered in the majority of network and customer premises applications.

As will be appreciated from the foregoing description, the above-described requirement that a test set user have a priori knowledge of the type of communication link to which the test set is coupled, in order to configure the test set to support a particular user interface and associated test set termination hardware (line cords), is effectively obviated by the test set interface of the present invention, which automatically determines the type of communication link to which the test set is coupled, and then configures the test set to support testing of that particular type, irrespective of which of a plurality of different types of communication signals the line is conveying.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. For use with a telephone test set having test circuitry for testing the operation of a telecommunication circuit to which the test set is connectable, an interface for coupling said telecommunication circuit to said test circuitry for testing said telecommunication circuit irrespective of which of a plurality of different types of communication signals is conveyed by said telecommunication circuit, said interface comprising:

a multiconductor connector arrangement configured for connection with any of multiple telecommunication circuits which convey different ones of said plurality of different types of communication signals; and a telecommunication circuit analysis unit, coupled to said multiconductor connector arrangement and to said test circuitry, and being operative to automatically sequentially analyze electrical characteristics of a respective telecommunication circuit to which said multiconductor connector arrangement is connected in accordance with respectively different telecommunication circuit condition detection operations, so as to determine which of said plurality of different types of communication signals is conveyed by said respective telecommunication circuit and, in response thereto, automatically configuring said test set circuitry to test the operation of said telecommunication circuit in accordance with which type of said plurality of different types of communication signals has been determined to be conveyed by said telecommunication circuit.

2. An interface according to claim 1, wherein said telecommunication circuit analysis unit is configured to automatically sequentially analyze said telecommunication circuit for presence of a voltage condition, dial tone and any one of plural types of communication signals having respectively different signalling formats.

3. An interface according to claim 1, wherein said communication signals having respectively different signalling formats comprise different types of digital communication signals.

4. An interface according to claim 1, wherein said telecommunication circuit analysis unit is configured to determine the magnitude of a voltage of said telecommunication circuit.

5. An interface according to claim 1, wherein said telecommunication circuit analysis unit comprises a plurality of interface circuits respectively configured to detect said communication signals having respectively different signalling formats, and a switching circuit coupled to said telecommunication circuit connection arrangement and operative to automatically sequentially provide a communication path between respectively different ones of said interface circuits and said telecommunication circuit connection arrangement.

6. An interface according to claim 1, wherein said telecommunication circuit analysis unit comprises a plurality of telecommunication circuit condition detection circuits respectively configured to detect the type of communication signals conveyed by said telecommunication circuit, and a switching circuit coupled to said telecommunication circuit connection arrangement and being operative to automatically sequentially provide a communication path between respectively different ones of said telecommunication circuit condition detection circuits and said telecommunication circuit connection arrangement, so as to enable one of said telecommunication circuit condition detection circuits to detect the type of communication signals conveyed by said telecommunication circuit.

7. An interface according to claim 1, wherein said multiconductor connector arrangement comprises a multiconductor line cord passing through an aperture in a body of said test set and containing a first multiconductor cable section having a first end thereof coupled to said telecommunication circuit analysis unit, and having a second end thereof terminated at a splice, with respective single wire cable sections extending from said splice and containing selected conductors of said first multiconductor cable section and being individually terminated by respective electrical connectors, and a multiconductor cable section extending from said splice, containing plural conductors of said first multiconductor cable section and being terminated by a second multiconductor connector for engagement with an associated multiconductor receptacle for said telecommunication circuit.

8. An interface according to claim 7, wherein said plural conductors of said second, multiconductor cable section correspond to respective ones of said plurality of conductors of said first multiconductor cable section.

9. An interface according to claim 7, wherein said selected conductors of said respective single wire cable sections correspond to tip and ring leads of said first multiconductor cable section.

10. An interface according to claim 7, wherein said respective electrical connectors comprise alligator clips.

11. An interface according to claim 7, wherein said multiconductor connector comprises an RJ type modular connector.

12. An interface according to claim 7, wherein said respective electrical connectors comprise alligator clips, and wherein said multiconductor modular connector comprises an RJ type modular connector.

13. For use with a telephone test set containing test circuitry for testing the operation of a telecommunication circuit, a method of coupling said telecommunication circuit to said test circuitry, so that said test set tests said telecommunication circuit irrespective of which of a plurality of different types of communication signals is conveyed by said telecommunication circuit, comprising the steps of:

(a) providing a multiconductor cable that is configured for connection with any of multiple types of telecommunication circuits which convey said different types of communication signals;

(b) connecting a first portion of said multiconductor cable with a telecommunication circuit to be tested conveying communication signals whose type is initially unknown at the time of connecting said first portion of said multiconductor cable with said telecommunication circuit;

(c) connecting a second portion of said multiconductor cable a telecommunication circuit analysis unit which is operative to automatically sequentially analyze electrical characteristics of said telecommunication circuit in accordance with respectively different telecommunication circuit condition detection operations and to determine therefrom which of said different types of communication signals is conveyed by said telecommunication circuit; and (d) in response to said telecommunication circuit analysis unit determining which of said plurality of different types of communication signals is conveyed by said telecommunication circuit, automatically configuring said test set circuitry to test the operation of said telecommunication circuit.

14. A method according to claim 13, wherein step (c) comprises causing said telecommunication circuit analysis unit to automatically sequentially analyze said telecommunication circuit for presence of a voltage condition, dial tone and any one of plural types of communication signals having respectively different signalling formats.

15. A method according to claim 13, wherein said communication signals comprise different types of digital communication signals.

16. A method according to claim 13, wherein step (c) comprises causing said telecommunication circuit analysis unit to determine the magnitude of a voltage of said telecommunication circuit.

17. A method according to claim 13, wherein said telecommunication circuit analysis unit comprises a plurality of telecommunication circuit condition detection circuits respectively configured to detect said communication signals having respectively different signalling formats, and wherein step (c) comprises automatically sequentially providing a communication path between respectively different ones of said telecommunication circuit condition detection circuits and said second portion of said multiconductor cable, so as to enable one of said telecommunication circuit condition detection circuits to automatically detect the type of communication signals conveyed by said telecommunication circuit.

18. A method interface according to claim 13, wherein said multiconductor cable comprises a multiconductor line cord passing through an aperture in a body of said test set and containing a first multiconductor cable section having a first end thereof coupled to said telecommunication circuit analysis unit, and having a second end thereof terminated at a splice, with respective single wire cable sections extending from said splice and containing selected conductors of said first multiconductor cable section and being individually terminated by respective electrical connectors, and a multiconductor cable section extending from said splice, containing plural conductors of said first multiconductor cable section and being terminated by a second multiconductor connector for engagement with an associated multiconductor receptacle for said telecommunication circuit.

19. A method according to claim 18, wherein said plural conductors of said second, multiconductor cable section correspond to respective ones of said plurality of conductors of said first multiconductor cable section.

20. A method according to claim 18, wherein said selected conductors of said respective single wire cable sections correspond to tip and ring leads of said first multiconductor cable section.

21. A method according to claim 18, wherein said respective electrical connectors comprise alligator clips.

22. A method according to claim 18, wherein said multiconductor connector comprises an RJ type modular connector.

23. A method according to claim 18, wherein said respective electrical connectors comprise alligator clips, and wherein said multiconductor modular connector comprises an RJ type modular connector.

* * * * *